(12) United States Patent
Van Velzen et al.

(10) Patent No.: US 9,251,284 B2
(45) Date of Patent: Feb. 2, 2016

(54) MIXING SYNCHRONOUS AND ASYNCHRONOUS DATA STREAMS

(75) Inventors: Danny Van Velzen, Redmond, WA (US); Jeffrey Van Gogh, Redmond, WA (US); Henricus Johannes Maria Meijer, Mercer Island, WA (US); Arun Sacheti, Sammamish, WA (US); Srikanth R Ravula, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 158 days.

(21) Appl. No.: 12/958,481

(22) Filed: Dec. 2, 2010

(65) Prior Publication Data

US 2012/0144054 A1    Jun. 7, 2012

(51) Int. Cl.
G06F 15/173    (2006.01)
G06F 17/30     (2006.01)
H04L 29/06     (2006.01)

(52) U.S. Cl.
CPC ........ G06F 17/3089 (2013.01); H04L 65/4015 (2013.01); H04L 65/605 (2013.01)

(58) Field of Classification Search
CPC .......................... H04L 65/605; H04L 65/4015
USPC .......................... 709/231, 232, 235, 237, 223
See application file for complete search history.

(56) References Cited

U.S. PATENT DOCUMENTS

| | | | |
|---|---|---|---|
| 5,761,430 A * | 6/1998 | Gross et al. | 709/225 |
| 7,530,015 B2 | 5/2009 | Sampathkumar et al. | |
| 7,644,414 B2 | 1/2010 | Smith et al. | |
| 7,979,571 B2 * | 7/2011 | Dillon et al. | 709/232 |
| 2002/0026502 A1 * | 2/2002 | Phillips et al. | 709/219 |
| 2005/0188051 A1 * | 8/2005 | Sneh | 709/213 |
| 2007/0168466 A1 * | 7/2007 | Tooley et al. | 709/218 |
| 2007/0226314 A1 * | 9/2007 | Eick et al. | 709/217 |
| 2007/0226365 A1 * | 9/2007 | Hildreth et al. | 709/231 |
| 2008/0005657 A1 * | 1/2008 | Sneh | 715/501.1 |
| 2008/0137756 A1 | 6/2008 | Scherlis et al. | |
| 2009/0112975 A1 * | 4/2009 | Beckman et al. | 709/203 |
| 2009/0157891 A1 * | 6/2009 | Hughes | 709/231 |
| 2011/0082946 A1 * | 4/2011 | Gopalakrishnan | 709/231 |
| 2011/0173345 A1 * | 7/2011 | Knox et al. | 709/246 |
| 2012/0054329 A1 * | 3/2012 | Gulati et al. | 709/224 |
| 2012/0137756 A1 * | 6/2012 | Brigmon et al. | 73/61.59 |

OTHER PUBLICATIONS

Oberg, et al., "Input and Output in .NET", Retrieved at <<http://www.informit.com/articles/article.aspx?p=29574&seqNum=2>>, Oct. 4, 2002, pp. 4.

"Input/Output", Retrieved at <<http://surebase.net/Data/Books/www.dantenetworks.com/books/books/csharpess2/csharpess2_snode43.html>>, Retrieved Date: Sep. 14, 2010, pp. 4.

(Continued)

*Primary Examiner* — Phuoc Nguyen

(74) *Attorney, Agent, or Firm* — Nicholas Chen; Kate Drakos; Mickey Minhas

(57) ABSTRACT

A queue can store streams of data acquired from servers asynchronously based upon received data requests and subsequent subscription with respect to one or more data sources/servers. The queue can be managed for subsequent synchronous or asynchronous release of received streams of data, for example.

20 Claims, 10 Drawing Sheets

(56) References Cited

OTHER PUBLICATIONS

"Basic File I/O", Retrieved at <<http://msdn.microsoft.com/en-us/library/336wast5.aspx>>, Retrieved Date: Sep. 14, 2010, pp. 3.

"TextWriter Class", Retrieved at <<http://msdn.microsoft.com/en-us/library/system.io.textwriter.aspx>>, Retrieved Date: Sep. 14, 2010, pp. 2.

"First Office Action and Search Report issued in Chinese Patent Application No. 201110415371.2", Mailed Date: Jan. 6, 2014, 14 Pages.

"Second Office Action Issued in Chinese Patent Application No. 201110415371.2", Mailed Date: Sep. 16, 2014, 9 Pages.

"Third Office Action Issued in Chinese Patent Application No. 201110415371.2", Mailed Date: Mar. 31, 2015, 8 Pages.

* cited by examiner

MIXING SYNCHRONOUS AND ASYNCHRONOUS DATA STREAMS

BACKGROUND

Web servers deliver web page content to clients through the use of a browser. A common web server hosts web page data and other included content such as images, style sheets, and the like. Moreover, the web server communicates web content upon received requests using Hypertext Transfer Protocol (HTTP) over the World Wide Web (www). A web page can include web content from multiple web servers. In other words, multiple web servers can host data for a particular web page which complicates the request/response transfer between a browser and targeted web servers. Additionally, web servers can further be associated with devices such as printers, routers, webcams, and the like serving a local network.

In a typical example, a browser can receive a Uniform Resource Locator (URL), wherein the URL can point to a web address and associated web content. The URL can be leveraged and translated into a request to a particular web server so as to receive the appropriate web content corresponding thereto. The browser can communicate this request to a target web server using, for instance, HTTP, to which the web server can respond with the requested information (e.g., web content, images, and the like). The browser can receive web content based upon the request. If the request is unable to be handled, an error message is displayed by the browser. Upon receipt of web content from the web server, the browser renders the web content associated with the URL.

In general, conventional web servers handle requests one at-a-time. For instance, a request for a web page can include a first element and a second element. The web server communicates the first element based on the request and will continue to the second element only upon completion of the first element. By way of example, a web page can include three parts, namely a header, a body, and a footer. To load the web page, interactions with one or more web servers are as follows. First, the header is requested and returned results are communicated to the client to load the header. Next, a request is issued for the body and results are returned to the client to load the body section. Finally, after the header and footer are both loaded the footer is requested and loaded. In other words, the web page is loaded synchronously.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure generally pertains to data provisioning. Subscription to streams of data from servers can be implemented to asynchronously acquire and communicate data elements based upon received data requests. By utilizing subscriptions, data elements can be collected independent of whether a result for the data element is a concrete value or a value from an asynchronous computation. Moreover, such data elements can be released (e.g., communicated, transmitted, drained) from a queue synchronously or asynchronously. By way of example and not limitation, a subscription to a server can be executed based upon a received data request in which continuous streams of bytes corresponding to the data request (e.g., a data element) can be collected and stored in a queue. Furthermore, the queue, storing the streamed bytes from servers, can be managed in order to optimally release (e.g., drain) completed data elements (e.g., data elements that received a total number of bytes from the stream) to a target which communicated the data request.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Details below are generally directed toward data provisioning. Data elements can be asynchronously collected and communicated via established data streams from servers, for example. A data request can relate to a particular data element hosted by a server. Furthermore, the data element typically includes bytes that can be a concrete value or a value resultant of asynchronous computations.

As utilized herein, a concrete value relates to a value that is independent and does not rely on any other values for construction. For example, a value "X" can be concrete if "X" is the only value that makes up "X." Moreover, as utilized herein, a value resultant of asynchronous computations relates to a value that includes multiple values that are dependent upon one another. For instance, a value "Z" can be a value resultant of asynchronous computations if "Z" is constructed from values "A," "B," and "C," wherein "A," "B," and "C" are received and computed asynchronously.

Conventionally, servers transmit data synchronously and a request is fulfilled upon completion of each data element associated with the data request. However, communication with a server can be extended to enable asynchronous data collection and release. In particular, a subscription to a server hosted data source can be executed based upon a received data request in which streams of data can be asynchronously collected for multiple data elements, for example data elements having concrete values and data elements with asynchronous computation values. Furthermore, the continuous streams of data from the servers can be stored in a queue, wherein the data elements stored in the queue are released (e.g., communicated, transmitted, drained, etc.) synchronously or asynchronously.

Various aspects of the subject disclosure are now described in more detail with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
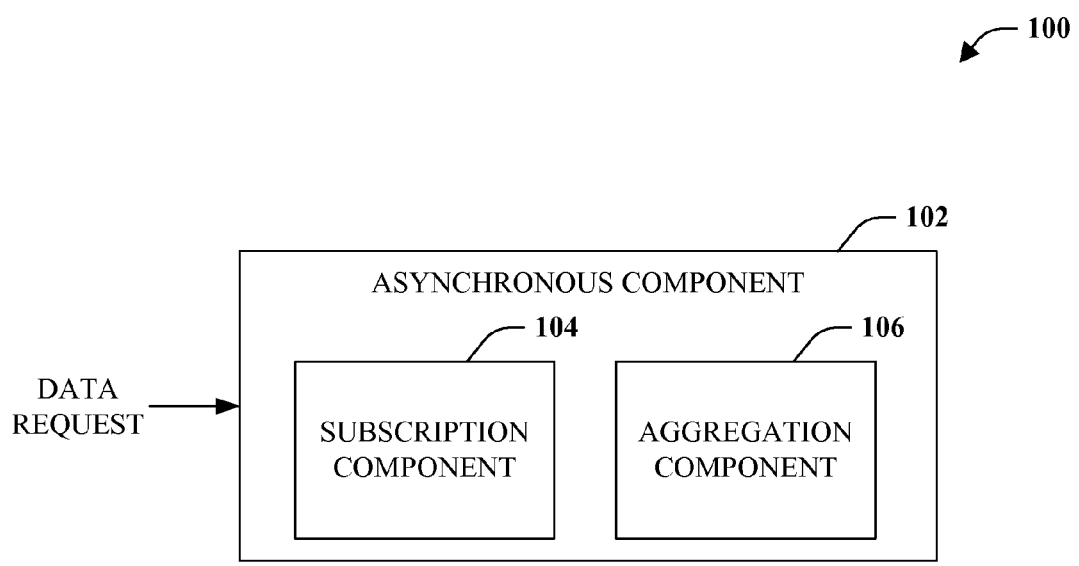
FIG. 1 is a block diagram of a data provisioning system.

Referring initially to FIG. 1, a data provisioning system 100 is illustrated. The data provisioning system 100 implements asynchronous data collection from servers based upon subscriptions to streams of data. Such asynchronous data collection by employment of data stream subscription reduces a server load and delivers responses for data requests with reduced delay. In general, the data provisioning system 100 aggregates bytes for data elements via streams of data from servers rather than conventional systems that receive one data element at-a-time from a server. Additionally, the data provisioning system 100 distributes data elements asynchronously and in an optimal manner in comparison to conventional systems.

The data provisioning system 100 can include an asynchronous component 102 that receives a data request. The data request can relate to a data element that includes bytes, wherein the data element is hosted by a server. It is to be appreciated that the data request can be received by any suitable component, module, machine, server, device, browser, and the like. By way of example and not limitation, each data element can be stored by a corresponding server. However, in another example, bytes associated with a data element can be hosted by more than one server. Furthermore, the data request can include results that are concrete values or results that are values from asynchronous computations.

The asynchronous component 102 further includes a subscription component 104 that subscribes to a data source that host data elements associated with the received data request. The data source can correspond to a server that hosts one or more data sources. In other words, data sources can be provided by one or more servers. It is to be appreciated that subscription to a server herein refers to subscribing to a data source, and in general, a data source is herein referred to as a server. In other words, based upon a data request, the subscription component 104 identifies a server (e.g., server that stores a data element associated with the data request) for subscription to an incoming data stream for any suitable data of the data element. It is to be appreciated that this subscription is to at least one stream of data from at least one server based upon at least one of the received data request and/or the communicated subscription. In addition to subscribing to data sources, the subscription component 104 can tag data streams for identification of which streams match to particular data elements (e.g., where a single stream is maintained comprising data elements from multiple streams). The tags for data streams and corresponding data elements can be based upon, by way of example and not limitation, data element type, data, data element unique identification (ID), data element reference name, stream subscription time stamp, etc.

The data provisioning system 100 asynchronously gathers data from servers by utilizing the subscription to streams of data from servers. In particular, the asynchronous component 102 further includes an aggregation component 106 that collects bytes of data via the streams of data from servers. The aggregation component 106 receives streams of data based upon the subscriptions and data requests, wherein two or more data elements are gathered from servers asynchronously. Furthermore, the aggregation component 106 can collect data from subscribed streams independent of whether the values are concrete values or values from asynchronous computations.

The data provisioning system 100 can process multiple data requests associated with data elements asynchronously by exploiting established data streams that push data to a requesting client upon availability. Moreover, the system 100 efficiently satisfies data requests with reduced delay by implementing data collection with streams as well as managing asynchronous release (e.g., drain) of the collected data from such streams upon receipt (discussed in more detail below).

Figure 2:
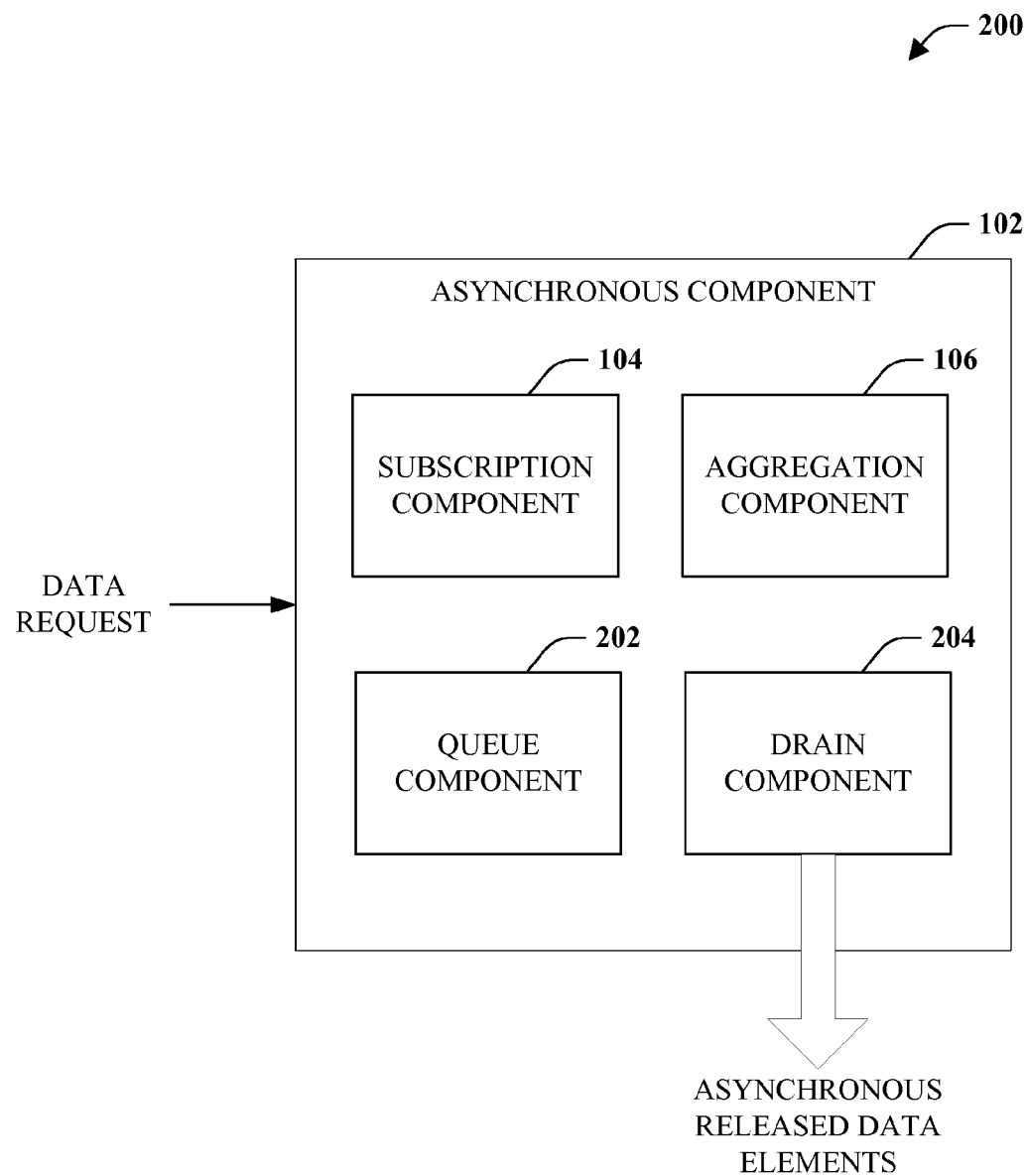
FIG. 2 is a block diagram of an asynchronous data provisioning system.

In a particular example, a web page can include a header, body, and footer. A data request for such data can be received and a subscription to data sources (e.g., web servers) hosting the data can be implemented. With the subscription, streams of data can be received for the header, body, and footer asynchronously. Rather than requesting data associated with a header and waiting until all header data is acquired and then requesting data associated with the body and so forth, header, body, and footer data can be requested and returned at arbitrary times. In this manner, data can be acquired for the header, body, and/or footer upon availability. In particular, data for the header, body, and footer can be interleaved. Furthermore, note that output of the data to the web page can be synchronous or asynchronous FIG. 2 illustrates an asynchronous data provisioning system 200. The asynchronous data provisioning system 200 includes the asynchronous component 102 that is configured to receive a data request for a data element. Based upon the data request, the subscription component 104 can open and tag a stream of data from a source to which the aggregation component 106 collects data there from. In order to fulfill the received data request, bytes of the data element and the data element can be stored and communicated as described below.

The asynchronous data collection system 200 also includes a queue component 202 and a drain component 204. The queue component 202 can store streams of data (e.g., bytes associated with the requested data element). It is to be appreciated that the queue component 202 can store bytes from multiple streams of data related to multiple data elements. As discussed, the tags employed by the subscription component 104 enable handling multiple streams of data for data elements. In another example, the system 200 can include a plurality of queue components. For instance, a queue component can be associated with each stream of data in order to handle multiple streams of data for data elements. In general, upon subscription to servers, the queue component 202 can store data streamed (e.g., continuous feed of bytes) from servers. The received data from streams can include values that are concrete results or values that are resultant of asynchronous computations. Thus, the queue component 202 continuously stores both concrete values for data elements and values that are resultant of asynchronous computations for data elements.

The drain component 204 facilitates asynchronously communicating data elements in order to satisfy the data request. The drain component 204 releases (e.g., drains, communicates, transmits, outputs) data elements from the queue component 202 by interleaving data elements (e.g., interleaving concrete values for with values resultant of asynchronous computations) from the queue component 202 in an optimal manner. Upon collection of a number of bytes that construct the data element, the data element can be communicated (e.g., written) to a source that communicated the data request, and such communication can be performed synchronously or asynchronously. Upon communication of the data element, the drain component 204 removes (e.g., deletes) the data element (e.g., including respective bytes) from the queue component 202. In other words, the queue component 202 continuously stores bytes for data elements until the data element is built (e.g., all bytes are received for a data element) and the drain component 204 manages the synchronous or asynchronous release of built data elements.

The drain component 204 can employ various techniques in order to asynchronously release built data elements. By way of example and not limitation, the drain component 204 can manage the queue component 202 based on queue size (e.g., a number of bytes stored limit), a number of stream subscriptions, a number of data elements, a number of data elements communicated to the source, a number of incoming data requests, a number of incoming data elements, a server characteristic (e.g., server memory, server CPU, server processor speed, server thread count, and the like), client/source characteristics (e.g., client throughput, client perceived page building performance, and the like), Network utilization (e.g., maximize filling of network packets), among other things. Additionally, the drain component 204 can employ throttling techniques in order to manage the queue component 202, and such techniques are described below.

Figure 3:
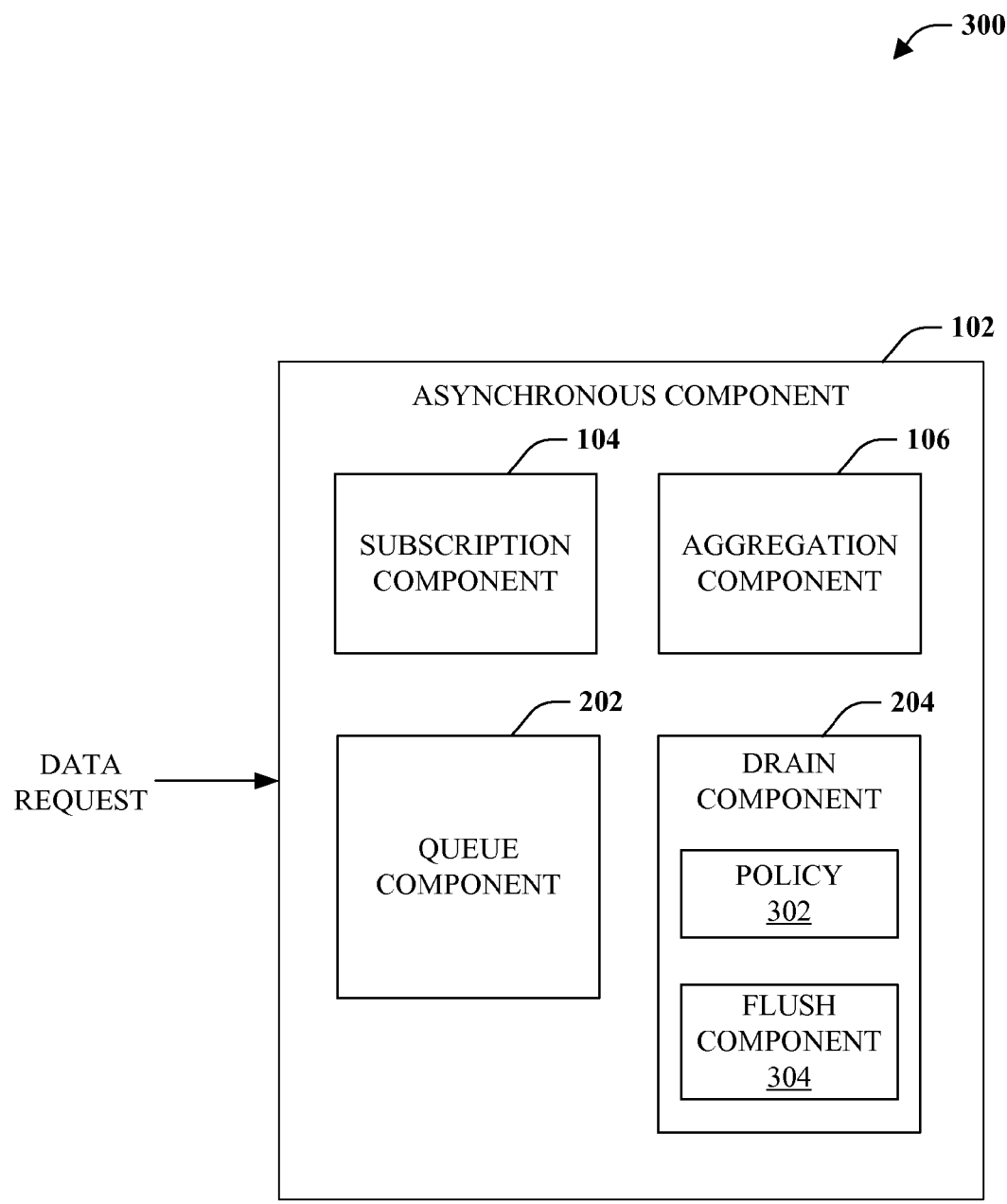
FIG. 3 is a block diagram of a data provisioning system that includes management of a queue.

FIG. 3 illustrates an exemplary data provisioning system 300 that includes management of a queue. The data provisioning system 300 includes the asynchronous component 102 that stores streams of data in the queue component 202 based on a received data request and a subscription executed by the subscription component 104. As discussed, the aggregation component 106 acquires streams of data from sources, wherein such streams are stored in the queue component 202 with tags (provided by the subscription component 104) for differentiation of data streams.

The asynchronous component 102 can partially stream down data to improve client-side performance. Additionally, the employment of the asynchronous component 102 is streamlined without many layers of abstraction to eliminate massive call stacks. The asynchronous component 102 further allows mixing and matching of synchronous logic and asynchronous logic.

As discussed, the asynchronous component 102 can allow streaming (e.g., from servers) of both concrete values and values that are results of asynchronous computations. The asynchronous component 102 can maintain a queue (e.g., a queue component 202 discussed in more detail below) with concrete and asynchronous values. The asynchronous component 102 can include a drain component 204 (also discussed in more detail below) for releasing the queue to an underling stream by interleaving results in the most optimal fashion By way of example and not limitation, the asynchronous component 102 can utilize the following class to create a super set:

```
public class AsyncTextWriter : TextWriter
{
    public AsyncTextWriter(Encoding encoding,
        Stream underlyingOutputStream);
    public override Encoding Encoding {get; }
}
```

The existing functionality of imperative writing is maintained by re-implementing at a minimum the "Write(char)" method. Additional overloads can be re-implemented based upon performance requirement demands.

To enable a mix of synchronous and asynchronous writes in an ordered fashion, the queue component 202 maintains a queue of writes. To be able to store both kind of writes (e.g., concrete value writes and writes of values resultant of asynchronous computations), the type IObservable (e.g., from .NET4.0 & Reactive Extensions) can be utilized. So the implementation becomes the following:

```
private Queue<IObservable<char>> m_queue;
    public override void Write(char value)
    {
        m_queue.Enqueue(Observable.Return(value));
    }
```

Next, the ability to pass in asynchronous values is added. Again, the basic form of this will be "IObservable<char>" with additional more optimal overloads. For instance, the following can be employed:

```
public virtual void Write(IObservable<char> value)
    {
        m_queue.Enqueue(value);
    }
```

The drain component 204, included with the asynchronous component 102, manages release of data elements from the queue component 202. In general, a data element, upon complete build (e.g., receipt of all bytes that comprise of the data element from the stream of data), can be released from the queue component 202 in which a release can include deletion from the queue component 202 and transmission to a client (e.g., requestor the data request, target communicating the data request . . . ).

Moreover, the drain component 204 can manage the queue component 202 based upon at least the outgoing released data elements and the incoming streamed bytes for data elements. In general, the drain component 204 can throttle the incoming data (e.g., streamed bytes for data elements) and outgoing data (e.g., built data elements in order to optimize performance of data provisioning. For instance, the number incoming data requests, number of subscriptions to servers, can be increased or decreased. In another example, the delay related to releasing data elements can be increased or decreased.

The asynchronous component 102 can also include a policy 302. The drain component 204 can exploit the policy 302 for release of data elements from the queue component 202. For instance, the policy 302 can be pre-defined or dynamically updated based on real-time incoming streams and/or outgoing data elements. By way of example and not limitation, the policy 302 can define limitations/rules such as a queue size (e.g., a number of bytes stored limit), a number of stream subscriptions, a number of data elements, a number of data elements communicated to the source, a number of incoming data requests, a number of incoming data elements, a server characteristic (e.g., server memory, server CPU, server processor speed, server thread count, and the like), client/source characteristics (e.g., client throughput, client perceived page building performance, and the like), Network utilization (e.g., maximize filling of network packets), etc.

In order eliminate any potential memory holes, the queue component 202 (e.g., the accumulated data) is drained. To ensure the queue is drained in an optimal way, the asynchronous component 102 employs an asynchronous pattern internally. In one implementation, release can occur after each write. In another implementation, the drain component 204 can utilize a framework's Asynchronous IO Application Programming Interface (API).

The drain component 204 can run as long as there are entries in the queue component 202. If the queue is empty, the drain component 204 can stop, and the asynchronous component 102 can start a new drain component 204 as soon as a new writes come in. It is to be appreciated that, in one example, no more than one drain is running at any time.

Here is an exemplary version of such the drain component 204. For clarity, locking code has not been included:

```
private void Drainer( )
{
    if (m_queue.Count > 0)
    {
        var current = m_queue.Dequeue( );
        current.AsyncWrite(m_underlyingOutputStream).Subscribe(
            _ => { }, Drainer);
    }
    else
    {
        m_running = false;
    }
}
```

Changes to "Write" to ensure the drain component 204 is started are illustrated by the following exemplary code snippet:

```
public virtual void Write(IObservable<char> value)
{
    m_queue.Enqueue(value);
    if (!m_running)
    {
        m_running = true;
        Drainer( );
    }
}
```

The data provisioning system 300 also includes a flush component 304. The flush component 304 is configured to flush data, or in other words output, or de-queue accumulated data. In particular, as in web scenarios it often is important to flush data frequently with a specified flushing policy. The flush component 304 can include a flush policy that includes, but not limited to, manual hints (e.g., a public flush method), flushing based on size of chunks to be communicated/sent, time since last flush, memory usage on server, kind of writes (e.g., pattern of sync/async writes), among other things.

While drain component 204 is running, a background thread can analyze the queue component 202 and perform optimizations like folding multiple subsequent synchronous writes into a single synchronous write, getting multiple asynchronous results whose values are available and merging those into a single synchronous write, among other things. By way of example and not limitation, a data element can include two concrete values and one value that is resultant of asynchronous computations. The drain component 204, utilizing a background thread, can collapse the two concrete values into a synchronous write/communication from the queue component and the available values (from the asynchronous computation) can be combined into a synchronous write/communication from the queue.

As the asynchronous component 102 potentially includes asynchronous computations, it becomes an asynchronous computation itself This computation can be completed once the asynchronous component 102 knows no more "Writes" (e.g., both synchronous and asynchronous) are going to be received. For this, the flush component 304 can utilize a "Close" method that returns an "IObservable<Unit>," as follows:
public IObservable<Unit>Close( );

The "IObservable<Unit>" can signal completion. It can do this when either: a) Upon calling close, the drain component 204 is not active, it can signal completion immediately and no further calls to "Write" are allowed; and b) If the drain component 204 is running, it can disallow any further calls to Write and upon completion of the drain component 204 (e.g., when the queue component 202 is empty) it will signal completion on the returned "IObservable<Unit>."

Figure 4:
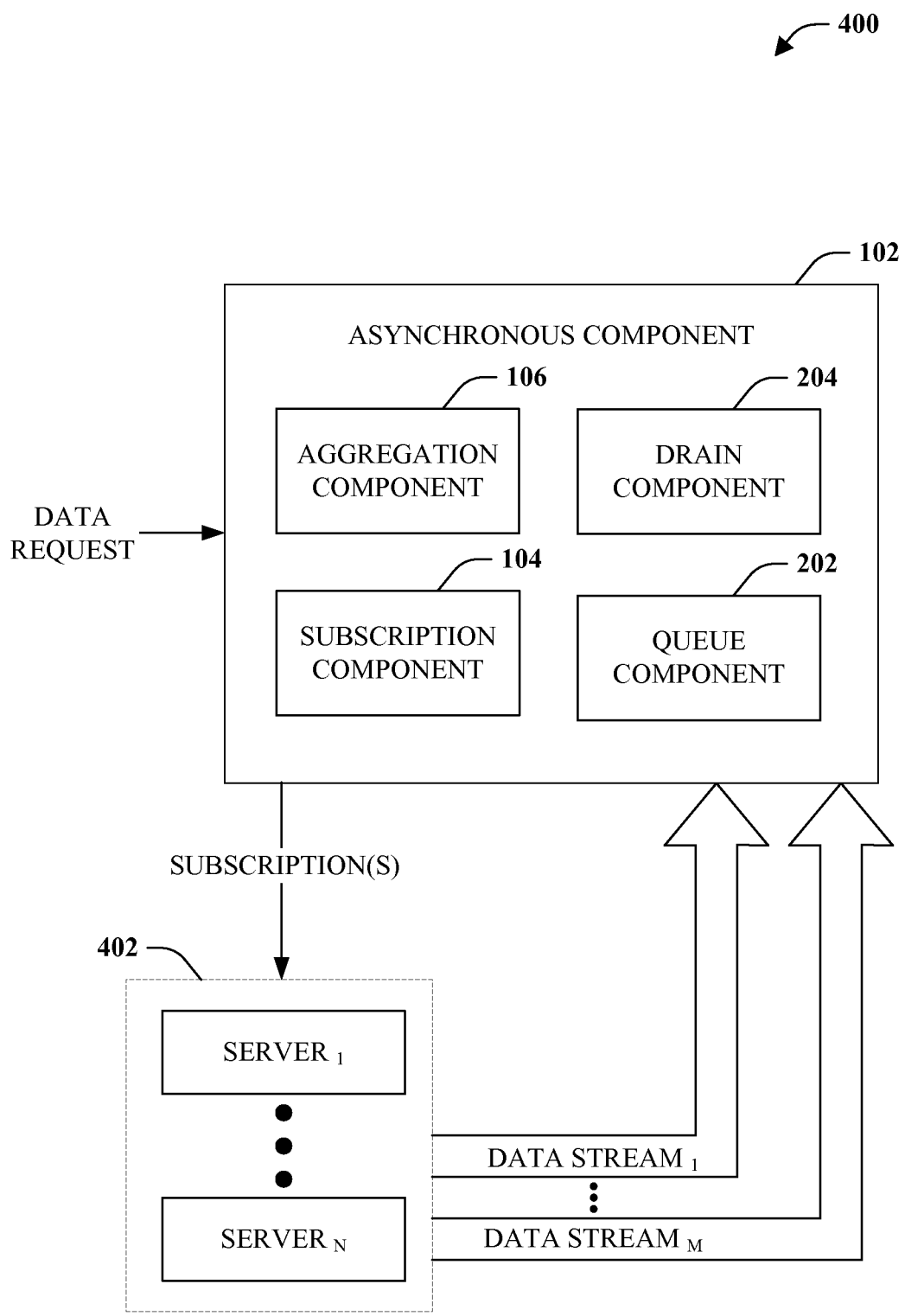
FIG. 4 is a block diagram of a data provisioning system that subscribes to servers for asynchronous data receipt.

FIG. 4 illustrates a data provisioning system 400 that subscribes to servers for asynchronous data receipt. The data provisioning system 400 includes the asynchronous component 102 that receives a data request related to a data element hosted by at least one server 402. The subscription component 104, based upon the data request, subscribes to at least one server 402 in order for the aggregation component 106 to acquire continuous streams of bytes for the requested data elements. It is to be appreciated that there can be any number of servers 402, such as server$_1$ to server$_N$, where "N" is a positive integer. Moreover, by way of example, and not limitation, the servers 402 can be any suitable servers. In a particular example related to data requests for web content, the servers 402 can be web servers.

In addition to subscribing to streams of data, the subscription component 104 can tag data streams from servers in order to identify which stream of data corresponds to a particular data element. By implementing such tagging, the streams of data are managed in an organized manner. For example, the system 400 can include any suitable number of data streams such as data stream$_1$ to data stream$_M$, where "M" is a positive integer.

The system 400 enables subscription with respect to servers to collect data elements asynchronously. Additionally, the system 400 employs the queue component 202 to store aggregated bytes for, or portions of, data elements. The drain component 204 manages the queue component 202 to release aggregated data elements asynchronously. The management of the queue component 202 can include releasing data elements, combining data elements (e.g., concrete values, values resultant of asynchronous computations) for release, throttling incoming streams, throttling outgoing data elements, maintaining a size range for the queue component 202, and the like.

Figure 5:
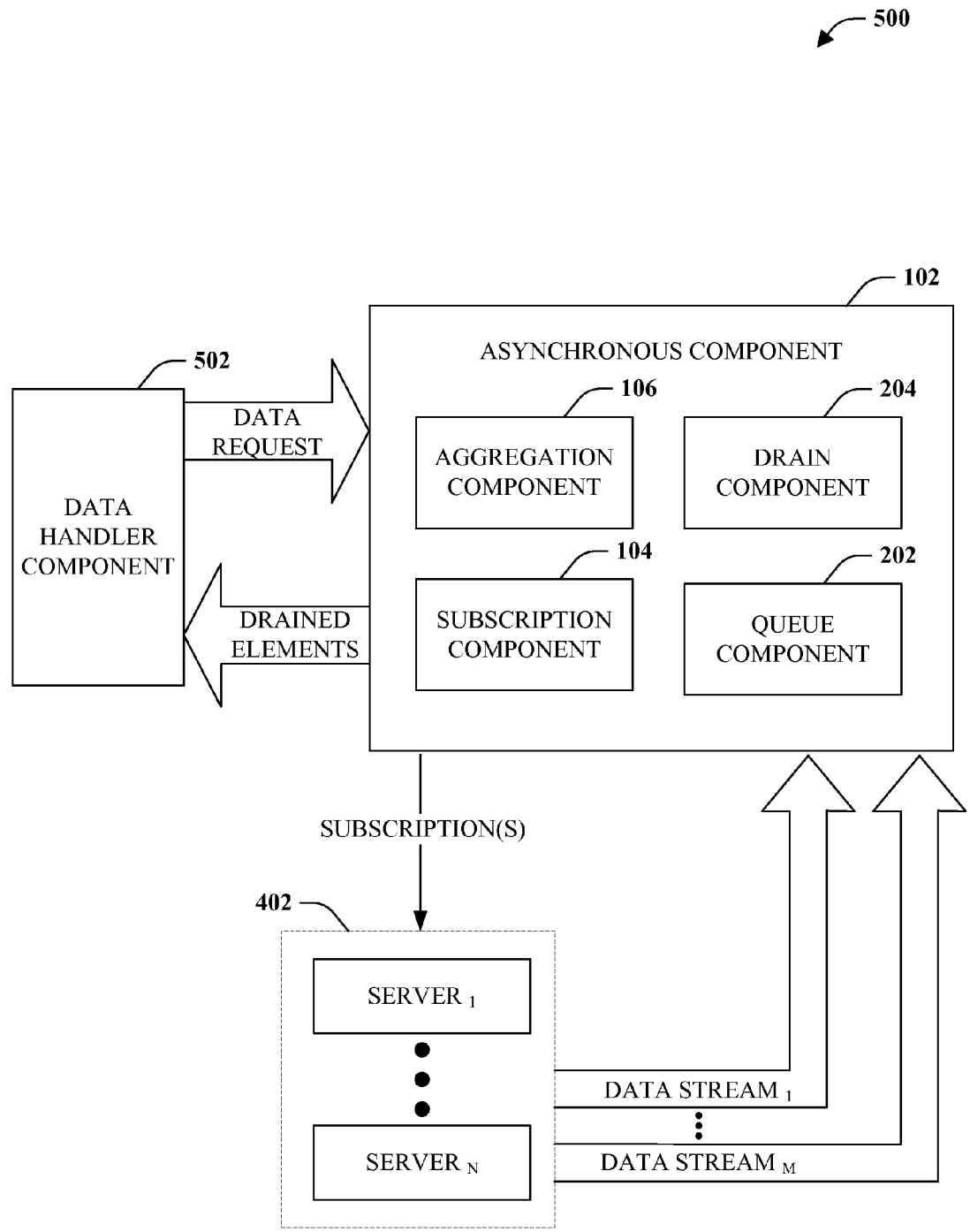
FIG. 5 is a block diagram of a system that facilitates utilizing asynchronously acquired data elements.

FIG. 5 illustrates a system 500 that facilitates utilizing asynchronously acquired data elements. The system 500 can include the asynchronous component 102 that utilizes the subscription component 104 to subscribe to data sources provided by servers 402 based upon a received data request. The data request can be communicated by a data handler component 502. The data handler component 502 can be, for instance, a browser, a machine, a computer, a client, a server, a computer program, and the like. The subscription component 104 tags a data stream from at least one server 402, in which the aggregation component 106 acquires streams of data asynchronously. Moreover, the streams of data are stored in the queue component 202 to enable the drain component 204 to optimally release (e.g., drain, write, communicate, transmit) data elements or bytes to the data handler component 502.

For example, the data element can include concrete values and values resultant of asynchronous computations. As streams of data are received and stored in the queue, the drain component 204 can release such values to the data handler component 502. In another example, release can be employed by combining concrete values together and releasing such combination. In still another example, release can be implemented by combining values together that are available (e.g., computed) from asynchronous computations upon and releasing such combination. In general, the drain component 204 can interleave data elements for release to the data handler component 502 independent of whether the data elements are concrete values or values resultant of asynchronous computations.

The aforementioned systems, architectures, environments, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the asynchronous component 102 or one or more sub-components thereof can employ such mechanisms to efficiently determine or otherwise infer subscriptions to servers, queue management, and/or tag streams from servers.

Figure 6:
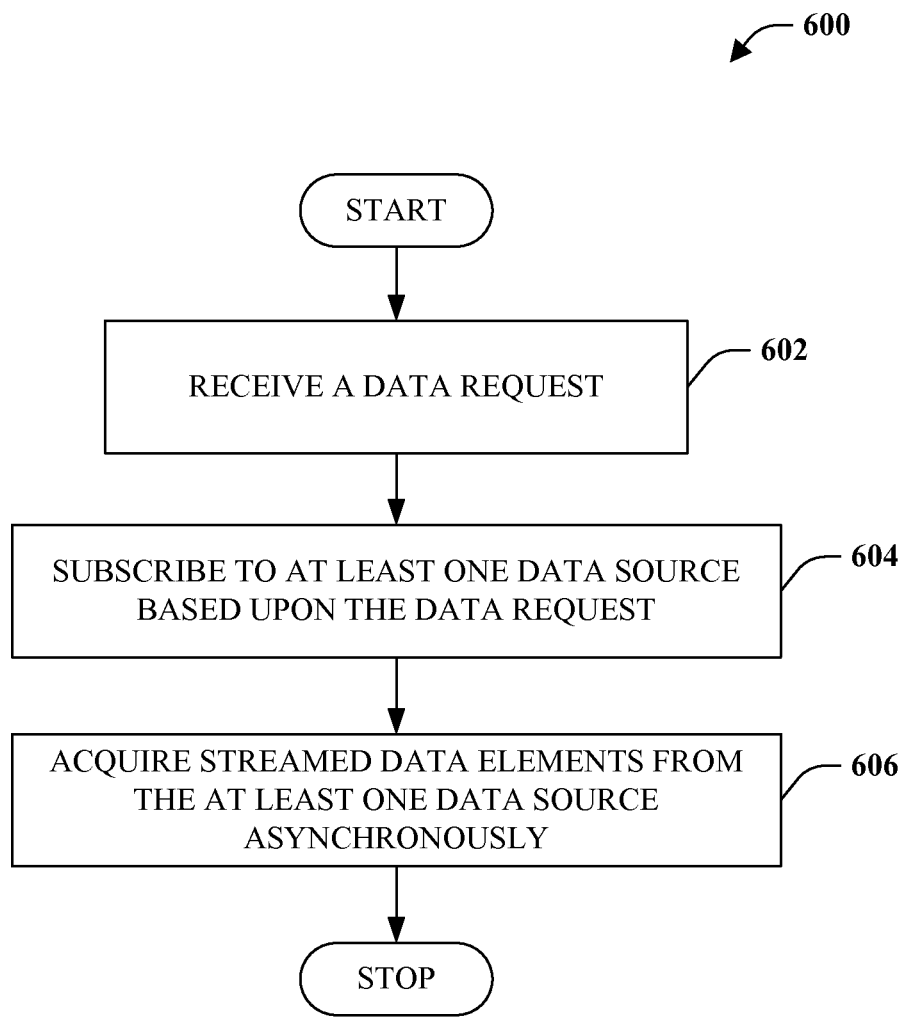
FIG. 6 is a flow chart diagram of a method of asynchronously collecting data elements from servers.
Figure 7:
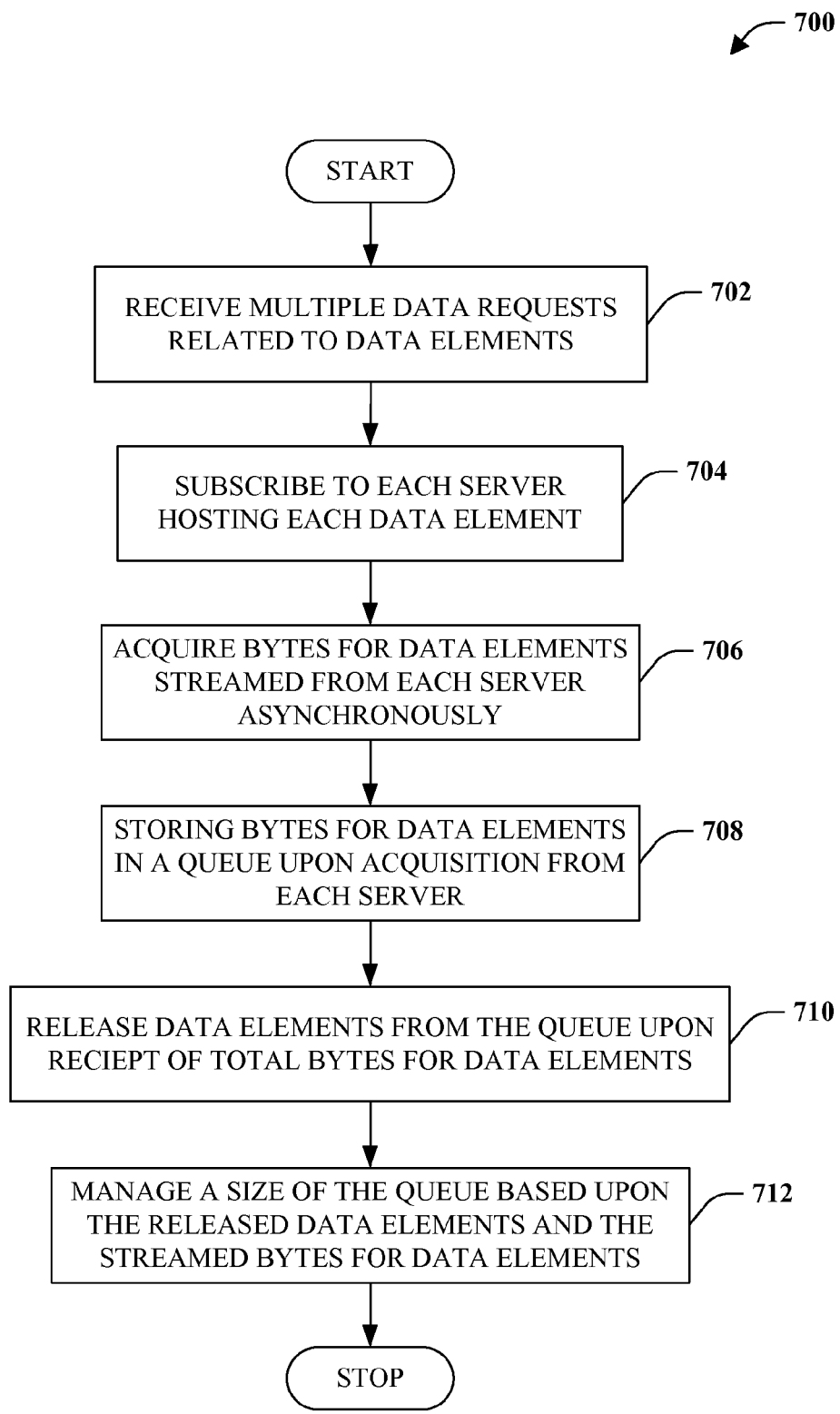
FIG. 7 is a flow chart diagram of a method managing a queue that asynchronously acquires data elements from servers.
Figure 8:
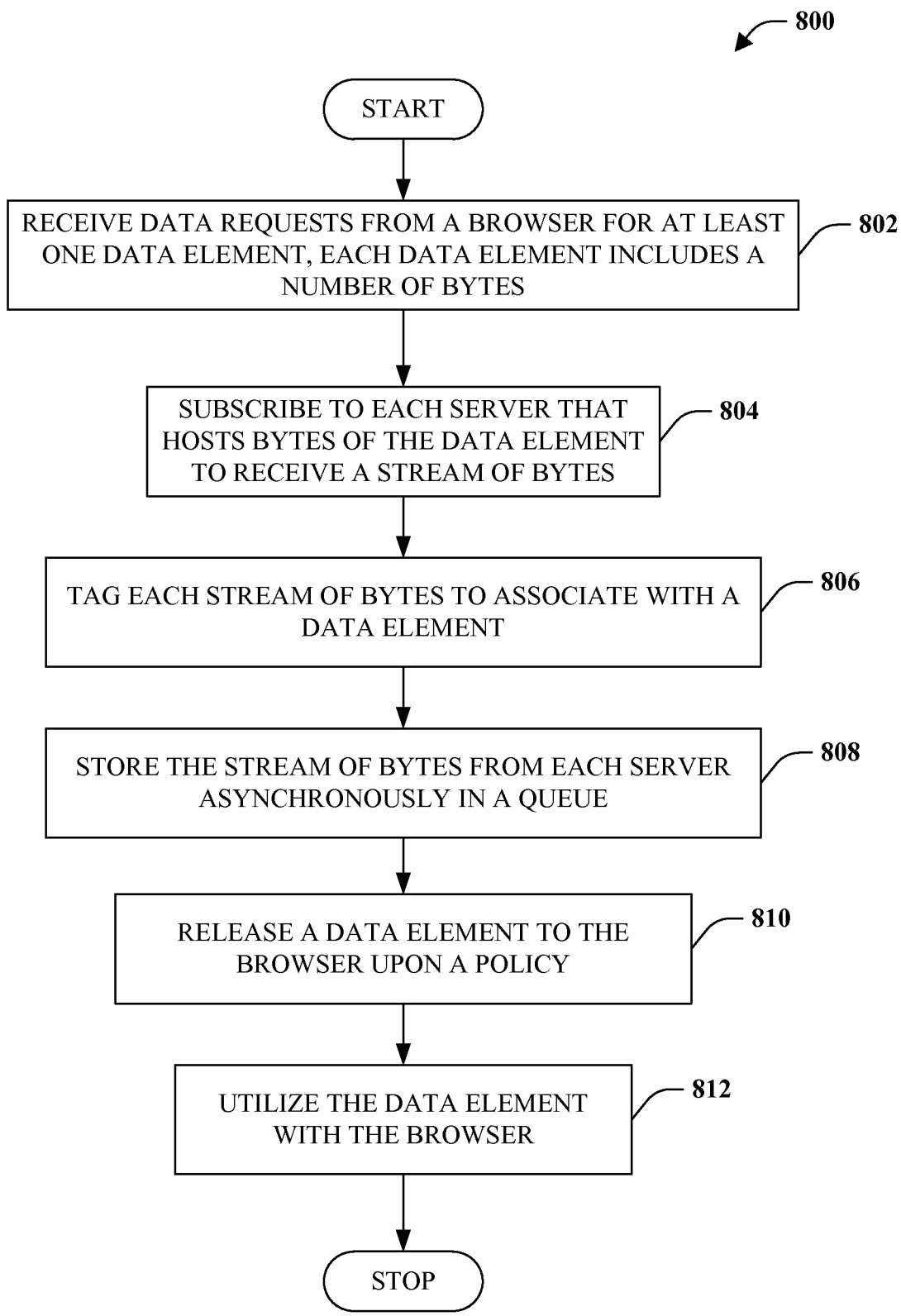
FIG. 8 is a flow chart diagram of a method rendering data elements asynchronously received from web servers.

In view of the exemplary systems described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring to FIG. 6, a method of asynchronously collecting data elements from servers 600 is illustrated. At reference numeral 602, a data request is received. By way of example and not limitation, two or more data requests can be received related to a data element and respective bytes for said data element. For instance, a first data request can be received for a first data element having a first number of bytes and a second data request can be received for a second data element having a second number of bytes. The data request can be communicated by, for example, a browser, a computer, a machine, and the like.

At reference numeral 604, at least one data source (e.g., data sources provided by servers) can be subscribed to based upon the data request. In general, a data element and respective bytes can be hosted by at least one data source, also referred to herein as simply a server. It is to be appreciated that a server can provide multiple data sources. Thus, based upon the data request and the data element related to such data request, subscription to the hosting server is implemented. At reference numeral 606, streamed data elements are acquired from the at least one server asynchronously. By way of example and not limitation, bytes for associated data elements are continuously streamed from the server based upon the subscription with respect to such servers. Furthermore, it is to be appreciated that the data elements associated to the data request can be concrete values and/or values based upon asynchronous computations. In other words, multiple data requests and data elements can be received and handled from respective servers concurrently and independent of server response time, request receipt, data element characteristics (e.g., byte size, server location, server speed, . . . ), and the like.

FIG. 7 depicts a method of managing a queue that asynchronously acquires and transmits data elements from servers 700. At reference numeral 702, multiple data requests related to data elements are received. For example, one or more data requests associated data elements hosted by at least one data source (e.g., server) can be received. Additionally, such data elements can include a number of bytes (e.g., the data element is constructed by building the corresponding number of bytes). At reference 704, a subscription to each server hosting each data element is employed. The subscription, based upon the multiple data requests received, is executed with each server, wherein each server corresponds to a data element included within the data request. In general, the subscription to the server enables a stream of data for continuous and asynchronous collection of data elements and associated bytes.

At reference numeral 706, streamed bytes for data elements are acquired from each server asynchronously. The bytes related to the data elements can be a concrete value and/or a value resulting from an asynchronous computation. However, independent of such characteristics (e.g., concrete value, value generated from an asynchronous computation, etc.), each server subscribed therewith streams bytes for each data element. At reference numeral 708, bytes for each data element are stored in a queue upon acquisition from each server. As described above, the streamed bytes for data elements are concurrently collected independent of the values being concrete and/or values resulting from asynchronous computations. The queue receives the streamed bytes and data elements from each subscribed server enabling asynchronous data element aggregation.

At reference numeral 710, data elements from the queue are released upon receipt of a total number of bytes for the data elements. In other words, once a total number of bytes are collected via the subscribed stream associated with the server, the data element can be transmitted—which allows for asynchronous release of data elements from a queue. For example, the data element can be transmitted to a browser, machine, computer, and the like for further processing or implementation. It is to be appreciated that the release of data elements can be optimized based on any suitable policy and release based upon a receipt of the total bytes for the data element is solely for exemplary purposes. For instance, a built data element (e.g., a data element that includes a total number of bytes) can be released based upon pre-defined criteria associated with a requestor of such data element. In general, the release of the data elements can be efficient by interleaving data elements (e.g., interleaving concrete results and asynchronous computed results) and enabling asynchronous data element communication.

At reference numeral 712, a size of the queue is managed based upon the released data elements and the streamed bytes for data elements. In general, the queue can be managed in order to maintain the size of the queue based on, for instance, memory capacity. Thus, the incoming data (e.g., streamed bytes for data elements) and outgoing data (e.g., built data elements) can be throttled in order to optimize performance of data provisioning. For instance, the number incoming data requests, number of subscriptions to servers, can be increased or decreased. In another example, the delay related to releasing data elements can be increased or decreased.

FIG. 8 is a flow chart diagram of a method of rendering data elements asynchronously received from web servers 800. At reference numeral 802, data requests from a browser for at least one data element are received, wherein each data element includes a number of bytes. Moreover, the data element can be a concrete value or a value that results from asynchronous computations. At reference numeral 804, a subscription to each server that hosts bytes of the data element is executed to receive a stream of bytes. By way of example and not limitation, the server can be a web server.

At reference numeral 806, each stream of bytes is tagged to associate with a data element. In other words, a tag is utilized for each stream of incoming bytes to link each stream with a respective data element. By way of example and not limitation, the tag can be based on criteria such as, but not limiting to, data element type, data element unique identification (ID), data-element reference name, stream subscription timestamp, and the like. It is to be appreciated that any suitable technique to match a stream from a server to a corresponding data element can be employed with the subject disclosure.

At reference numeral 808, the streams of bytes are stored from each server asynchronously in a queue. The queue can concurrently collect streams of bytes from multiple servers in order to satisfy the data request for such data elements. In other words, independent of the data element(s) having a concrete value or a value resulting from asynchronous computations, the queue can aggregate streams of bytes from servers for multiple data elements and, in turn, multiple data requests.

At reference numeral 810, a data element is released to the browser based upon a policy. The policy can optimize the queue and transmission of data elements to the browser. For instance, the policy can include interleaved transmission of data elements to the browser independent of whether the data elements are concrete values or values resultant of asynchronous computations. In another example, the policy can release built data elements upon completion (e.g., receipt of total number of bytes for the data element) to the browser. In still another example, the built data elements can be prioritized based upon a requestor-here, the browser.

At reference numeral 812, the data element (e.g., the built data element including the total number of bytes received via the stream from the web server) is utilized with the browser. In a particular example, the data element can be rendered by the browser for display.

Figure 9:
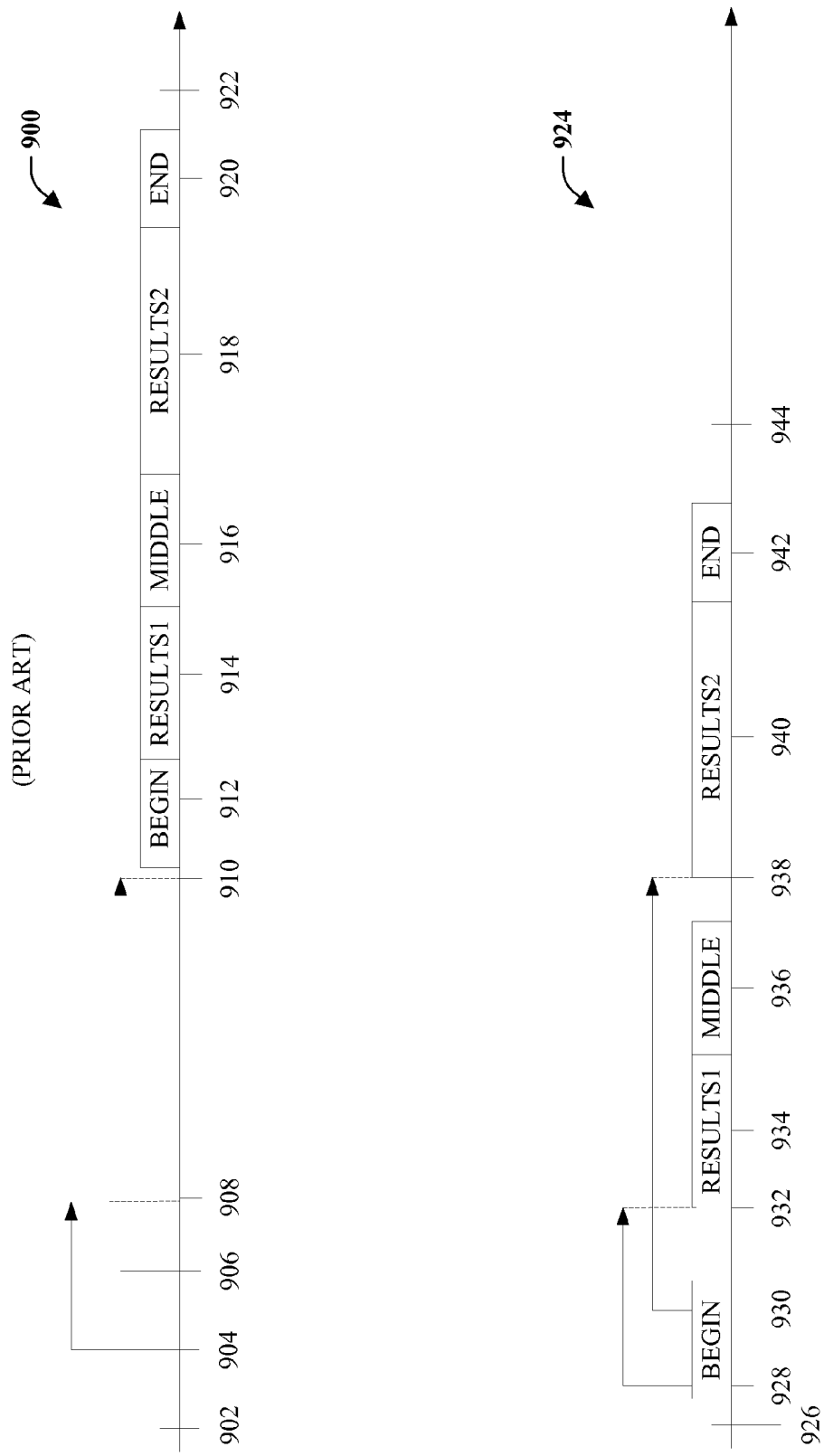
FIG. 9 depicts timelines of data requests.

FIG. 9 illustrates a first timeline 900 and a second timeline 924. The first timeline 900 is indicative of prior art. At reference numeral 902, a server receives a request. At reference numeral 904, a server starts RESULTS1. At reference numeral 906, a server starts RESULTS2. At reference numeral 908, RESULTS1 is completed. At reference numeral 910, RESULTS2 is completed. At reference numeral 912, transmission to a client begins. At reference numeral 914, RESULTS1 is communicated to the client. At reference numeral 916, MIDDLE is communicated to the client. At reference numeral 918, RESULTS2 is communicated to the client. At reference numeral 920, transmission to a client ends. At reference numeral 922, the request is completed.

The first timeline 900 illustrates the synchronous handling of data requests. In general, the synchronous handling hinders the transmission of RESULTS1, MIDDLE, and RESULTS2 to the client. The transmission of RESULTS1, although complete, is not communicated to the client until RESULTS2 is complete. In light of the prior art technique, server load and client wait time is increased for the request. The first timeline 900 can be represented as follows:

```
var result1;
MvcAsyncController.Register(BeginAsyncCall1, result=>
    result1=result);
var result2;
MvcAsyncController.Register(BeginAsyncCall1, result=>
    result1=result);
Return Async(r=>
{
    Write(start);
    Write(result1);
    Write(middle);
    Write(result2);
    Write(end);
}
```

Turning to the second timeline 924, an asynchronous aggregation of results is depicted. In particular, the second timeline 924 enables concrete values and values from asynchronous computations to be interleaved for deliver to a client.

At reference numeral 926, a server receives a request. At reference numeral 928, a server starts RESULTS1. At reference numeral 930, a server starts RESULTS2. During the start of RESULTS1 and RESULTS2, the transmission to the client begins. At reference numeral 932, RESULTS1 is completed. At reference numeral 934, RESULTS1 is communicated to the client. At reference numeral 936, MIDDLE is communicated to the client. At reference numeral 938, RESULTS2 is completed. At reference numeral 940, RESULTS2 is communicated to the client. At reference numeral 942, the transmission to the client ends. At reference numeral 944, the request is completed.

As shown in the second timeline 924, the asynchronous handling is more efficient to fulfill requests and deliver results to a client. In particular, the duration of time for deliver is reduced. Moreover, the client receives data satisfying the initial request earlier in comparison to synchronous handling. Also, with the employment of the second timeline 924, the server load is reduced. The second timeline 924 can be representative of the following:

```
Writer.Write(start);
Writer.Write(AsyncCall1);
Writer.Write(middle);
Writer.Write(AsyncCall2);
Writer.Write(end);
```

As used herein, the terms "component" and "system," as well as forms thereof are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner It is to be appreciated a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic - that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 10:
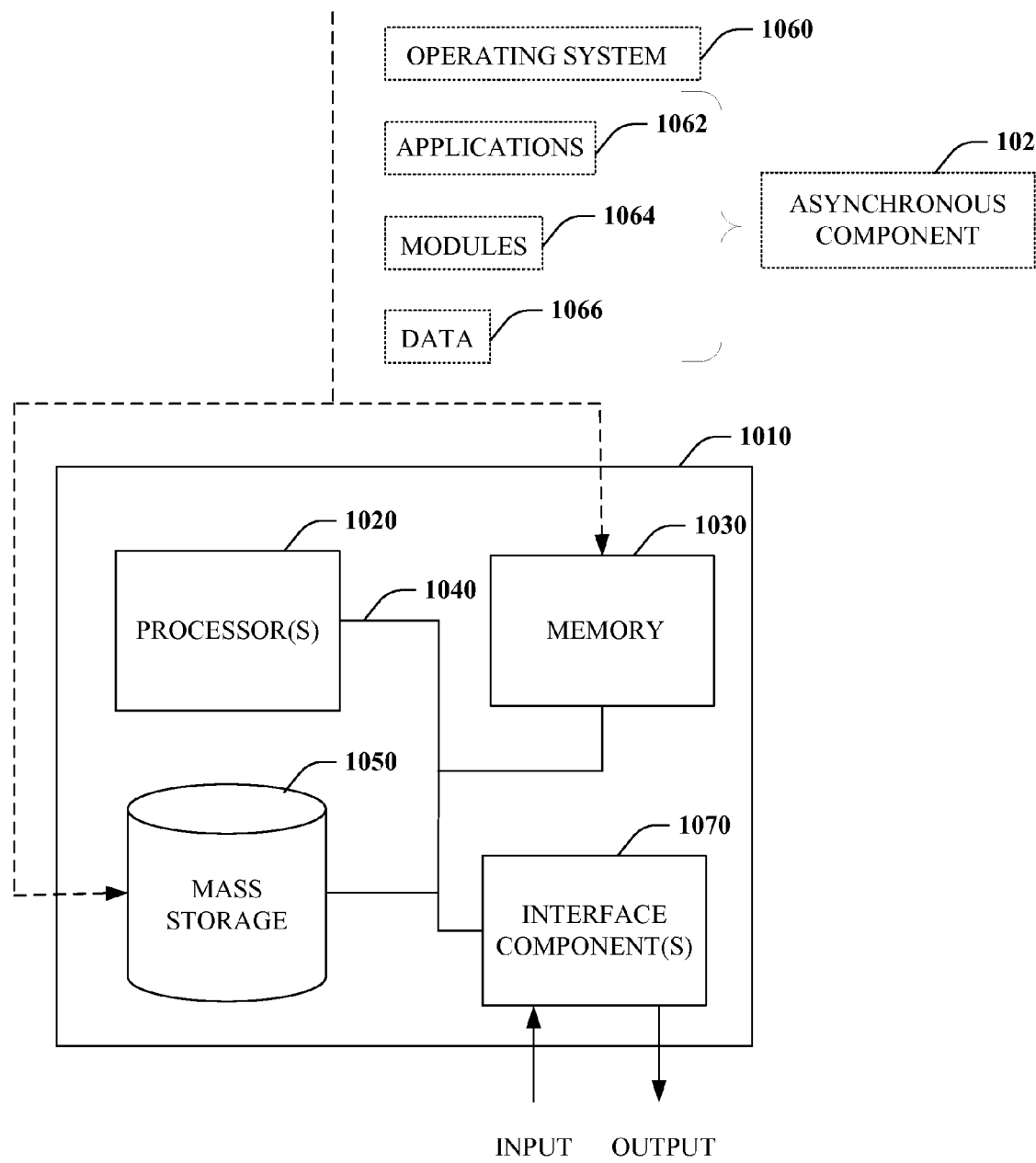
FIG. 10 is a schematic block diagram illustrating a suitable operating environment for aspects of the subject disclosure.

In order to provide a context for the claimed subject matter, FIG. 10 as well as the following discussion are intended to provide a brief, general description of a suitable environment in which various aspects of the subject matter can be implemented. The suitable environment, however, is only an example and is not intended to suggest any limitation as to scope of use or functionality.

While the above disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. Aspects can also be practiced in distributed computing environments where tasks are performed by remote processing devices that are linked through a communications network. However, some, if not all aspects of the claimed subject matter can be practiced on stand-alone computers. In a distributed computing environment, program modules may be located in one or both of local and remote memory storage devices.

With reference to FIG. 10, illustrated is an example general-purpose computer 1010 or computing device (e.g., desktop, laptop, server, hand-held, programmable consumer or industrial electronics, set-top box, game system . . . ). The computer 1010 includes one or more processor(s) 1020, memory 1030, system bus 1040, mass storage 1050, and one or more interface components 1070. The system bus 1040 communicatively couples at least the above system components. However, it is to be appreciated that in its simplest form the computer 1010 can include one or more processors 1020 coupled to memory 1030 that execute various computer executable actions, instructions, and or components.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration.

The computer 1010 can include or otherwise interact with a variety of computer-readable media to facilitate control of the computer 1010 to implement one or more aspects of the claimed subject matter. The computer-readable media can be any available media that can be accessed by the computer 1010 and includes volatile and nonvolatile media and removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules, or other data. Computer storage media includes, but is not limited to memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid state devices (e.g., solid state drive (SSD), flash memory drive (e.g., card, stick, key drive . . . ) . . . ), or any other medium which can be used to store the desired information and which can be accessed by the computer 1010.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1030 and mass storage 1050 are examples of computer-readable storage media. Depending on the exact configuration and type of computing device, memory 1030 may be volatile (e.g., RAM), non-volatile (e.g., ROM, flash memory . . . ) or some combination of the two. By way of example, the basic input/output system (BIOS), including basic routines to transfer information between elements within the computer 1010, such as during start-up, can be stored in nonvolatile memory, while volatile memory can act as external cache memory to facilitate processing by the processor(s) 1020, among other things.

Mass storage 1050 includes removable/non-removable, volatile/non-volatile computer storage media for storage of large amounts of data relative to the memory 1030. For example, mass storage 1050 includes, but is not limited to, one or more devices such as a magnetic or optical disk drive, floppy disk drive, flash memory, solid-state drive, or memory stick.

Memory 1030 and mass storage 1050 can include, or have stored therein, operating system 1060, one or more applications 1062, one or more program modules 1064, and data 1066. The operating system 1060 acts to control and allocate resources of the computer 1010. Applications 1062 include one or both of system and application software and can exploit management of resources by the operating system 1060 through program modules 1064 and data 1066 stored in memory 1030 and/or mass storage 1050 to perform one or more actions. Accordingly, applications 1062 can turn a general-purpose computer 1010 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, the asynchronous component 102 can be, or form part, of an application 1062, and include one or more modules 1064 and data 1066 stored in memory and/or mass storage 1050 whose functionality can be realized when executed by one or more processor(s) 1020, as shown.

In accordance with one particular embodiment, the processor(s) 1020 can correspond to a system-on-a-chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the asynchronous component 102, and/or associated functionality can be embedded within hardware in a SOC architecture.

The computer 1010 also includes one or more interface components 1070 that are communicatively coupled to the system bus 1040 and facilitate interaction with the computer 1010. By way of example, the interface component 1070 can be a port (e.g., serial, parallel, PCMCIA, USB, FireWire . . . ) or an interface card (e.g., sound, video . . . ) or the like. In one example implementation, the interface component 1070 can be embodied as a user input/output interface to enable a user to enter commands and information into the computer 1010 through one or more input devices (e.g., pointing device such as a mouse, trackball, stylus, touch pad, keyboard, microphone, joystick, game pad, satellite dish, scanner, camera, other computer . . . ). In another example implementation, the interface component 1070 can be embodied as an output peripheral interface to supply output to displays (e.g., CRT, LCD, plasma . . . ), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A method of facilitating data provisioning, comprising:
    employing at least one processor configured to execute computer-executable instructions stored in memory to perform the following acts:
    acquiring data asynchronously for at least one of a plurality of data elements;
    storing the data in a data structure; and
    managing asynchronous output of the data from the data structure based on an amount of data in the data structure, wherein solely the output is subject to network transmission.

2. The method of claim 1, storing the data comprises storing at least one concrete value, comprising an independent value, and at least one value resultant of an asynchronous computation.

3. The method of claim 2 further comprises:
    combining concrete values;
    outputting the combined concrete values;
    combining received values resultant of the asynchronous computation; and
    outputting the combined values resultant of the asynchronous computation.

4. The method of claim 3, managing asynchronous output of the data from the data structure further comprises interleaving combined concrete values with combined received values resultant of the asynchronous computation.

5. The method of claim 1 further comprises throttling the outputting act based upon at least one of an incoming data request, a size of the data structure, or an amount of outputted data elements.

6. The method of claim 1 further comprises managing the data structure based upon at least one of a size of the data structure, a number of stream subscriptions, a number of data elements, a number of data elements communicated to a source, a number of incoming data requests, a number of incoming data elements, a server characteristic, a client/source characteristic, or a network utilization.

7. The method of claim 1 further comprises transmitting the output data elements from the data structure to a web browser.

8. The method of claim 1 further comprises managing the asynchronous output of the data in a manner that maximizes filling of network packets.

9. The method of claim 1, further comprises managing the asynchronous output of the data based on acquisition of data comprising a complete data element.

10. The method of claim 1 further comprising combining two or more data values in the data structure prior to output.

11. The method of claim 1 further comprises managing the asynchronous output of the data from the data structure in a predetermined ordered sequence.

12. A system that facilitates data provisioning, comprising:
a processor coupled to a memory, the processor configured to execute the following computer-executable components stored in the memory:
a first component configured to store data as the data is acquired asynchronously from at least one data source; and
a second component configured to control release of the data asynchronously based on asynchronous acquisition of a complete data element, wherein solely released data is subject to network transmission.

13. The system of claim 12, the first component is configured to store data acquired in response to a first request that relates to a first data element and a second request that relates to a second data element.

14. The system of claim 13, the first data element is a concrete value that comprises an independent value and the second data element is a value resultant of an asynchronous computation.

15. The system of claim 13 further comprises a third component configured to tag the data with data source distinguishing information.

16. The system of claim 13, the second component is configured to interleave release of concrete values and values resultant of an asynchronous computation.

17. The system of claim 13 further comprising a third component configured to throttle storage of data based upon at least one of an amount of incoming data requests, an amount of released data, or a size of a storage structure, wherein the throttle includes at least one of an increase of release or a decrease of release.

18. The system of claim 13 further comprises a third component configured to combine concrete values and values resultant of asynchronous computations.

19. A method of data provisioning, comprising:
employing at least one processor configured to execute computer-executable instructions stored in memory to perform the following acts:
subscribing to one or more data sources in response to requests for multiple data elements;
collecting portions of the data elements upon asynchronous acquisition from the one or more data sources; and
controlling output of the data elements asynchronously upon receipt of complete data elements, wherein solely the output is subject to packetization and network transmission.

20. The method of claim 19 further comprises transmitting the data elements to a web browser.

* * * * *